US008592534B2

(12) United States Patent
Han et al.

(10) Patent No.: US 8,592,534 B2
(45) Date of Patent: Nov. 26, 2013

(54) POLY(FERROCENYL)SILANE BASED POLYMER, METHOD OF PREPARING THE SAME, AND FILM INCLUDING THE POLY(FERROCENYL)SILANE BASED POLYMER

(75) Inventors: Moon Gyu Han, Yongin-si (KR); Gennadi A. Emelchenko, Moscow (RU); Alexander M. Kalsin, Moscow (RU); Nikolai A. Ustynyuk, Moscow (RU); Tatyana A. Peganova, Moscow (RU)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 152 days.

(21) Appl. No.: 13/165,221

(22) Filed: Jun. 21, 2011

(65) Prior Publication Data
US 2011/0317253 A1    Dec. 29, 2011

(30) Foreign Application Priority Data

Jun. 23, 2010  (RU) .............................. 20100125697
Oct. 15, 2010  (KR) ........................ 10-2010-0101034

(51) Int. Cl.
*C08F 230/04*  (2006.01)
*C08F 230/08*  (2006.01)

(52) U.S. Cl.
USPC ................ 525/478; 525/477; 528/32; 528/31

(58) Field of Classification Search
USPC ................. 528/32, 31; 525/478, 477
See application file for complete search history.

(56) References Cited

U.S. PATENT DOCUMENTS 5,844,052 A * 12/1998 Keller et al. ................. 525/474
6,423,460 B1  7/2002 Drappel et al.
6,423,461 B1 * 7/2002 Drappel et al. .......... 430/111.35

OTHER PUBLICATIONS

Gomez-Elipe, J. Am. Chem. Soc. 1998, 120, 8348-8356.*
Alonso, J. Of Organomet. Chem., 637-639 (2001) 642-652.*
Acikgoz, et al., "Direct surface structuring of organometallic resists using nanoimprint lithography", Nanotechnology 20 (2009) (pp. 1-7).
Wurm, et al., "Electroactive Linear-Hyperbranched Block Copolymers Based on Linear Poly(ferrocenylsilane)s and Hyperbranched Poly(carbosilane)s", Chemistry—A European Journal (2009) (pp. 9068-9077).
Jaska, et al., "Metal-catalyzed routes to rings, chains and macromolecules based on inorganic elements", The Royal Society of Chemistry (2003) (pp. 4015-4021).
Cyr, et al., "Photopatternable Metallopolymers: Photo-Cross-Linking and Photolithography of Polyferrocenylsilane Methacrylates", Macromolecules, vol. 37, No. 11 (Jun. 1, 2004).
Puzzo, Daniel P., et al., *Angew. Chem. Int. Ed.*, vol. 48, pp. 943-947 (2009).
Wrighton, Mark S., et al., *J. Am. Chem. Soc.*, vol. 100, No. 23, pp. 7264-7271 (1978).
Ni, Yizeng, et al.,*J. Am. Chem. Soc.*, vol. 118, pp. 4102-4114 (1996).
Foucher, Daniel, et al., *Macromolecules*, vol. 27, pp. 3992-3999 (1994).

* cited by examiner

*Primary Examiner* — Robert C Boyle
(74) *Attorney, Agent, or Firm* — Harness, Dickey & Pierce, P.L.C.

(57) ABSTRACT

Provided are poly(ferrocenyl)silane based network polymers, methods of preparing the same, and films including the poly (ferrocenyl)silane based network polymers. The network polymers have a steric network structure and are prepared by using a simplified process.

14 Claims, 3 Drawing Sheets

POLY(FERROCENYL)SILANE BASED POLYMER, METHOD OF PREPARING THE SAME, AND FILM INCLUDING THE POLY(FERROCENYL)SILANE BASED POLYMER

CROSS REFERENCE TO RELATED APPLICATIONS

This application claims priority under U.S.C. §119 to Russian Patent Application No. 2010125697, filed on Jun. 23, 2010, in the Federal Service for Intellectual Property, Patents and Trademarks (ROSPATENT) Office, and Korean Patent Application No. 10-2010-0101034, filed on Oct. 15, 2010, in the Korean Intellectual Property Office (KIPO), the entire contents of each of which is incorporated herein by reference.

BACKGROUND

1. Field

Example embodiments relate to poly(ferrocenyl)silane based polymers, methods of preparing the same, and films including the poly(ferrocenyl)silane based polymers. The poly(ferrocenyl)silane based polymers are prepared using a simplified process and thus the manufacturing costs thereof are relatively low. In addition, the poly(ferrocenyl)silane based polymers are used in a photonic crystal matrix.

2. Description of the Related Art

Electroactive polymers (EAP) are polymers that convert an electrical energy into a mechanical energy, or vice versa. EAPs can be categorized into ionic EAPs and electrical EAPs, and examples of ionic EAPs may include ionic polymer metal composites and conducting polymers, and examples of electrical EAPs may include dielectric elastomers and electrostrictive polymers. These polymers are used for different purposes due to their different characteristics. Among these polymers, ionic polymer metal composites are most suitable for use in displays due to their lower driving voltage and relatively short response time. However, using ionic polymer metal composites in a photonic crystal matrix may be difficult.

The manufacture of EAPs using oxidation and reduction properties of organo-metallic component-containing crosslinked polymers has been taken into consideration. In this regard, ferrocene-group containing monomers are very suitable for forming an EAP having an improved performance because they have a resistance to oxygen and water and are reversibly, electrochemically oxidized and reduced in various solvents.

Such monomers are polymerized by ring-opening polymerization (ROP), e.g., thermal polymerization or metal-catalyzed polymerization. However, the thermal polymerization requires a relatively high temperature of about 130 to 280° and an inert atmospheric condition, and is not effective for controlling a molecular weight of a polymer.

Anionic polymerization may be performed under a relatively mild condition with a higher polymerization rate and may be effective for controlling a molecular weight of a polymer, while extremely pure monomers obtained by a plurality of purification processes are required. A polymerization reaction using platinum based catalysts does not require higher temperatures and relatively high-purity monomers, which are required for thermal polymerization and anionic polymerization, although this polymerization method is not effective for controlling a molecular weight of a polymer.

SUMMARY

Provided are poly(ferrocenyl)silane based network polymers which are produced by using a simplified process, methods of preparing the poly(ferrocenyl)silane based network polymers and the films including the poly(ferrocenyl)silane based network polymers. Additional aspects will be set forth in part in the description which follows and, in part, will be apparent from the description, or may be learned by practice of example embodiments.

According to example embodiments, a poly(ferrocenyl)silane based network polymer may include a repeating unit represented by Formula 1, a repeating unit represented by Formula 2, and a repeating unit represented by Formula 3:

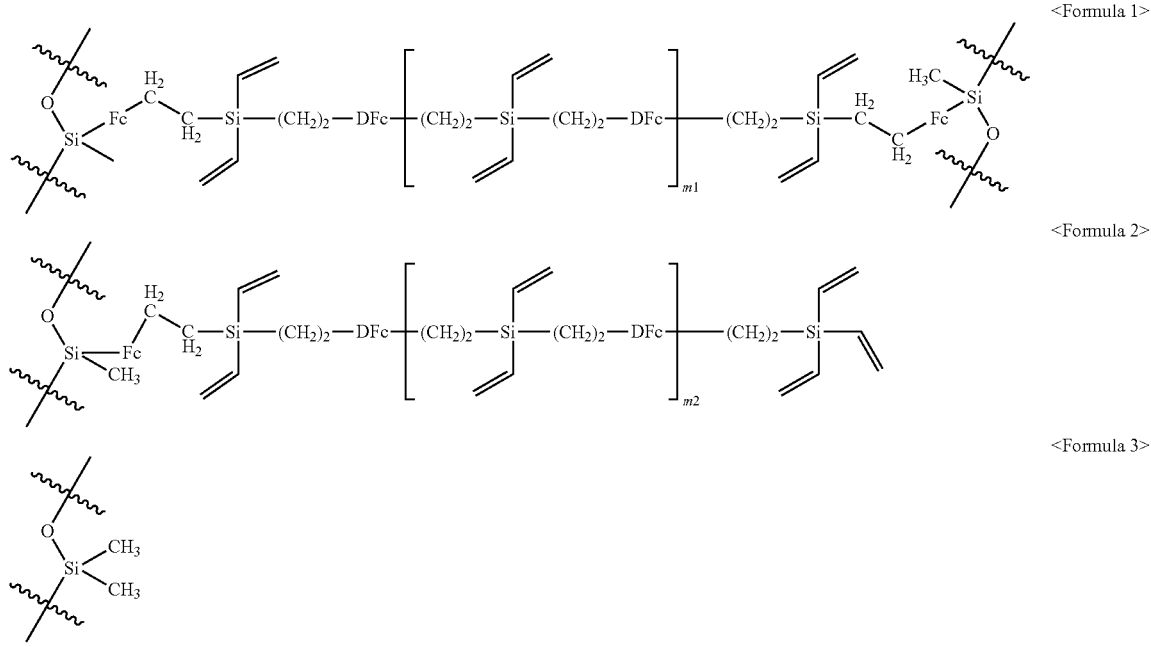

<Formula 1>

<Formula 2>

<Formula 3> wherein Fc is a ferrocenylene group represented by Formula 4a, DFc is a diferrocenyl silane-based linking group represented by Formula 4b, and m1 and m2 are each independently 0 or 1:

According to example embodiments, a method of preparing poly(ferrocenyl)silane based network polymer may include cross-linking a base polymer represented by Formula 5 with a cross-linker represented by Formula 6:

<Formula 5>

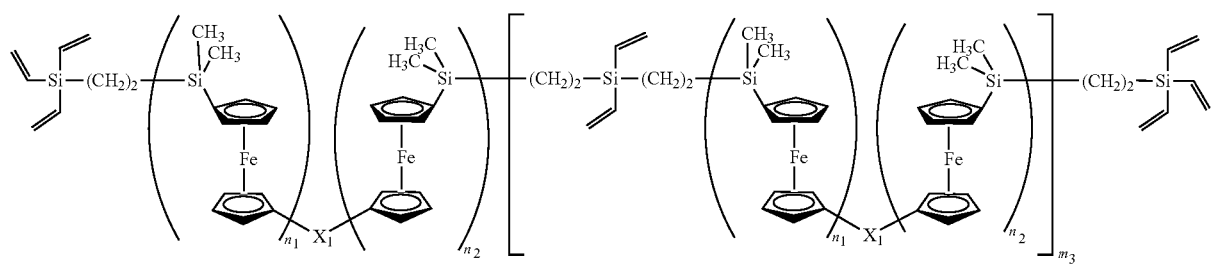

wherein
$n_1$ and $n_2$ are each independently a number of about 5 to about 95,
m3 is 0 or 1,
$X_1$ is <Formula 4a>

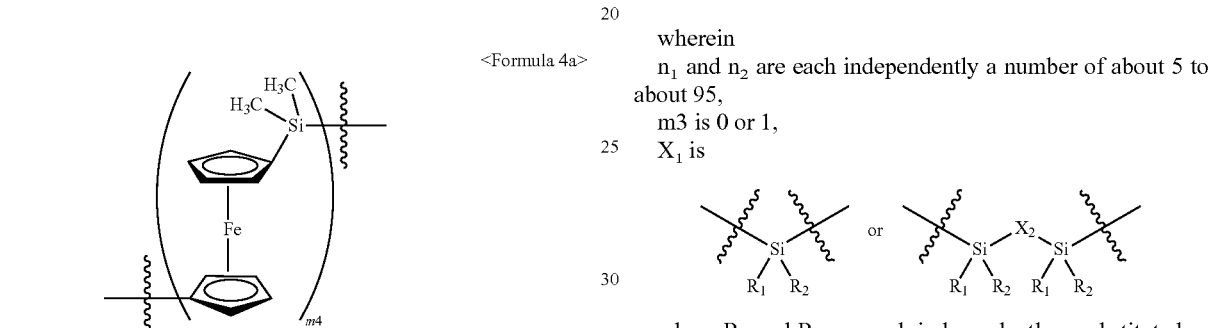

wherein m4 is a number of about 1 to about 10;

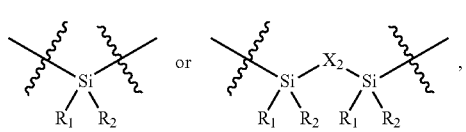

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group;

<Formula 4b>

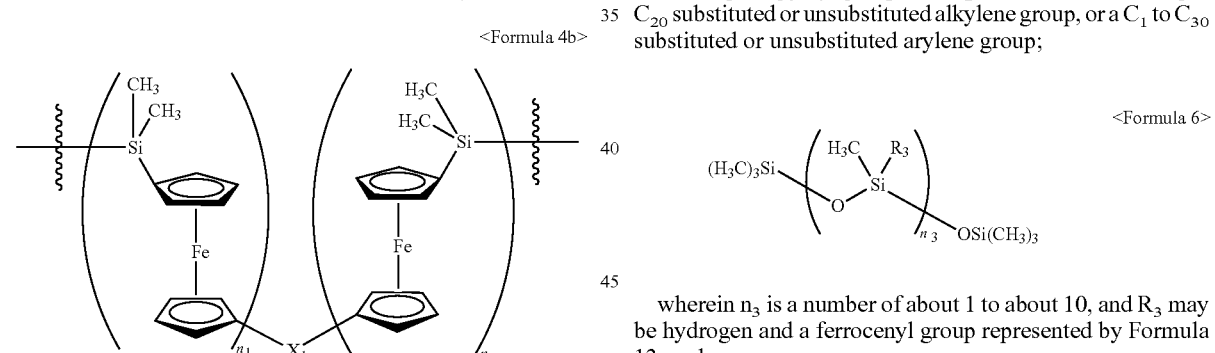

<Formula 6>

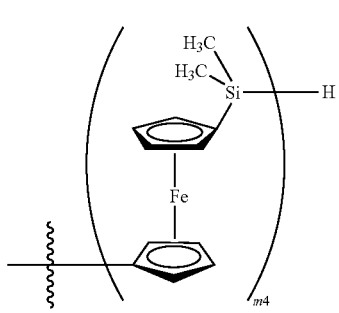

wherein $n_3$ is a number of about 1 to about 10, and $R_3$ may be hydrogen and a ferrocenyl group represented by Formula 13, and
when hydrogen and a ferrocenyl group coexist as $R_3$, a ratio of hydrogen to the sum of hydrogen and the ferrocenyl group is in the range of 0.1 to 0.9:

wherein
$n_1$ and $n_2$ are each independently a number of about 5 to about 95,
$X_1$ is <Formula 13> wherein $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

wherein m4 is a number of about 1 to about 10.

According to example embodiments, a polymer film may include the poly(ferrocenyl)silane based network polymer described above bonded to a substrate.

According to example embodiments, a reflection type color display device may include a cathode, an anode, and an electrolyte between the cathode and the anode, wherein the electrolyte includes the poly(ferrocenyl)silane based network polymer of example embodiments and a photonic crystal.

According to example embodiments, a device may include the poly(ferrocenyl)silane based network polymer of example embodiments.

BRIEF DESCRIPTION OF THE DRAWINGS

These and/or other aspects will become apparent and more readily appreciated from the following description of example embodiments now to be described in detail with the accompanying drawings. In the drawings.

DETAILED DESCRIPTION

Figure 1:
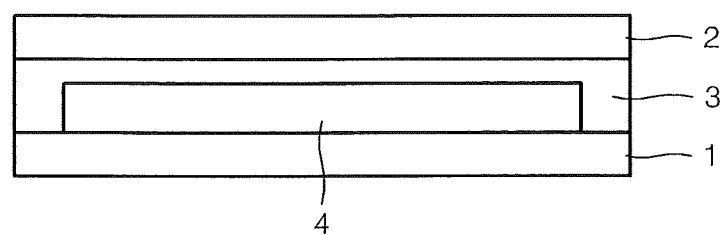
FIG. 1 shows an example of a reflection type color display device according to example embodiments.

Reference will now be made in detail to example embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In the drawings, the thicknesses of layers and regions are exaggerated for clarity. Like reference numerals in the drawings denote like elements.

An electroactive and cross-linked poly(ferrocenyl)silane based network polymer according to example embodiments may include a repeating unit represented by Formula 1, a repeating unit represented by Formula 2, and a repeating unit represented by Formula 3:

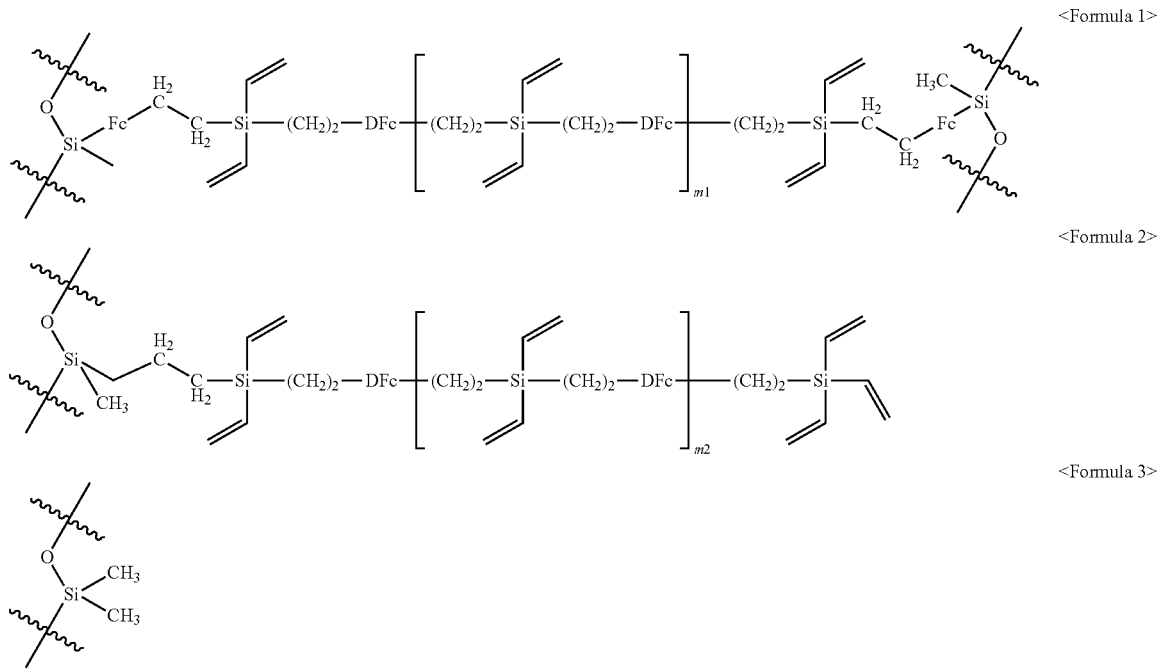

<Formula 1>

<Formula 2>

<Formula 3> wherein Fc is a ferrocenylene group represented by Formula 4a, DFc is a diferrocenyl silane-based linking group represented by Formula 4b, and m1 and m2 are each independently 0 or 1;

<Formula 4a> wherein m4 is a number of about 1 to about 10;

<Formula 4b>

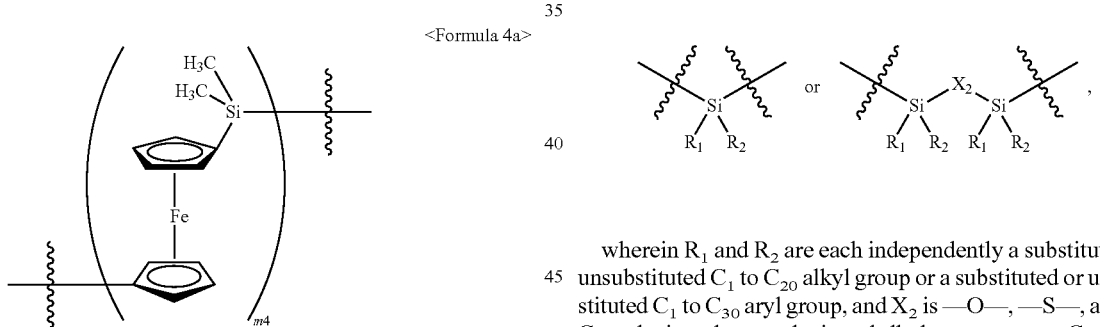

wherein $n_1$ and $n_2$ are each independently a number of about 5 to about 95, $X_1$ is

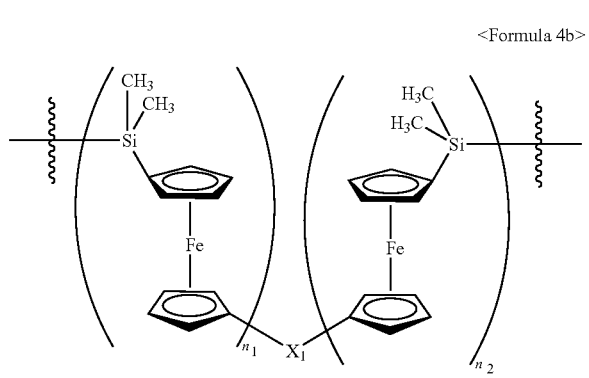

wherein $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

According to example embodiments, in the network polymer, the repeating unit of Formula 1 may have a polymerization degree of, for example, about 5 to about 100, the repeating unit of Formula 2 may have a polymerization degree of, for example, about 5 to about 100, and the repeating unit of Formula 3 may have a polymerization degree of, for example, about 10 to about 25.

According to example embodiments, if the repeating unit of Formula 1 is repeated, at least one of the repeating unit of Formula 2 and the repeating unit of Formula 3 may be interposed between repeating units of Formula 1.

The poly(ferrocenyl)silane based network polymer including the repeating unit represented by Formula 1, the repeating unit represented by Formula 2, and the repeating unit represented by Formula 3 may be prepared by polymerizing a base polymer represented by Formula 5 and a cross-linker represented by Formula 6:

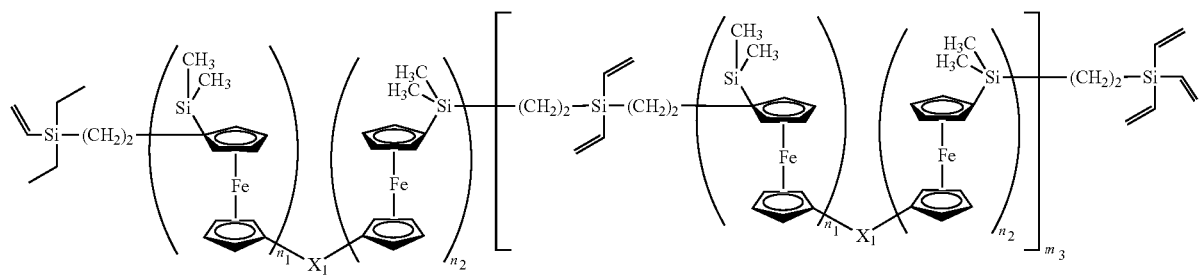

<Formula 5> wherein $n_1$ and $n_2$ are each independently a number of about 5 to about 95,
m3 is 0 or 1,
$X_1$ is

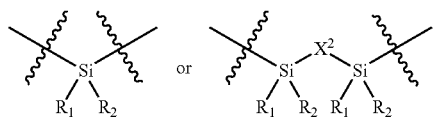

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group;

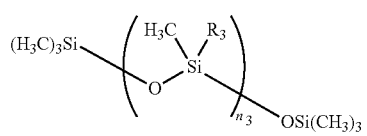

<Formula 6> wherein $n_3$ is a number of about 1 to about 10, and $R_3$ may be hydrogen and a ferrocenyl group represented by Formula 13, and when hydrogen and a ferrocenyl group coexist as $R_3$, a ratio of hydrogen to the sum of hydrogen and the ferrocenyl group is in the range of about 0.1 to about 0.9:

<Formula 13> wherein m4 is a number of about 1 to about 10.

Polymers according to example embodiments may have various repeating units in their back bones, and although these repeating units are described as a separate entity herein, the polymers may also be block copolymers or random copolymers.

In regard to the base polymer of Formula 5, when m3 is 0, the base polymer may be a base polymer represented by Formula 7:

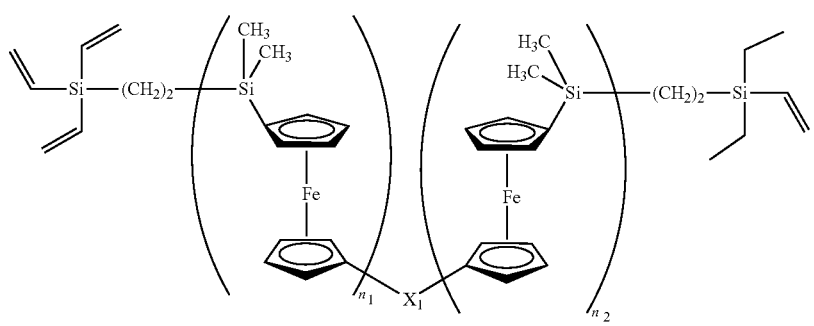

<Formula 7> wherein $n_1$ and $n_2$ are each independently a number of about 5 to about 95, $X_1$ is

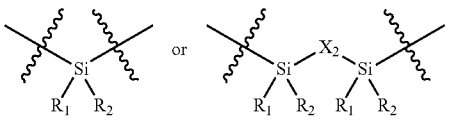

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

Preparation of Base Polymer

The base polymer represented by Formula 7 may be prepared according to Reaction Scheme 1:

Reaction Scheme 1

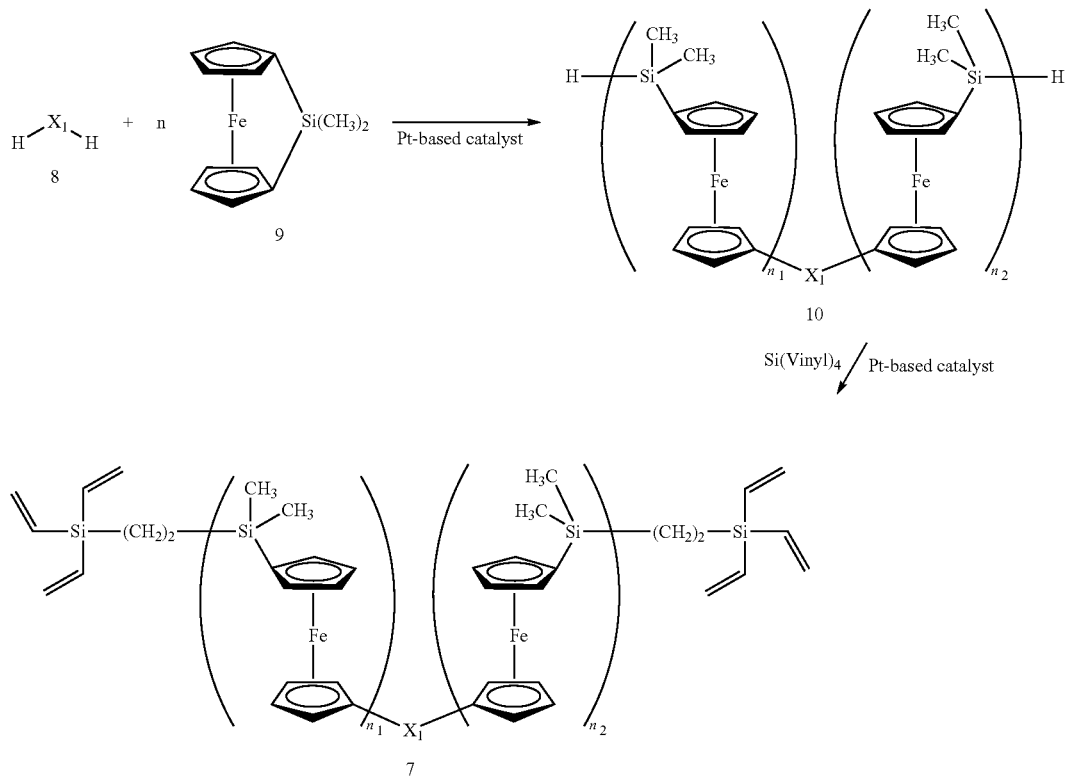

wherein
$X_1$ is

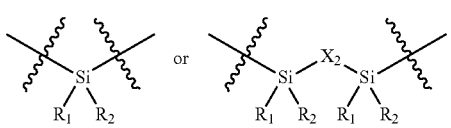

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group, $n_1$ and $n_2$ are each independently a number of about 5 to about 95, and n represents $n_1+n_2$.

The preparation method according to Reaction Scheme 1 is a method of preparing a linear base polyferrocenylsilane. According to Reaction Scheme 1, the dihydrosilane-based compound of Formula 8 is reacted with dimethylsila[1]ferrocenophane of Formula 9, thereby producing linear oligoferrocenylsilane of Formula 10 having Si—H at both ends by ring-opening polymerization, and then excess tetravinylsilane is added thereto, thereby producing oligoferrocenylsilane of Formula 7 having a trivinylsilyl at ends by hydrosilylation. In regard to the base polymer of Formula 7, the sum of $n_1$ and $n_2$ may be in the range of about 10 to about 100.

The ring-opening polymerization and the hydrosilylation of Reaction Scheme 1 may be performed in the presence of a Pt-based catalyst, and examples of the Pt-based catalyst include $Pt[(CH_2=CH-SiMe_2)_2O]_{1.5}$ that is a Carstedt's catalyst, and $Pt[(C_2H_4)Cl_2]_2$ that is Zeise salt dimmer. The amount of the Pt-based catalyst may be in the range of about 0.01 mol % to about 1 mol % based on about 1 mol of a reactant.

The hydrosilylation may be performed about 2 to about 10 times more quickly when excess $Si(vinyl)_4$ are used therewith, and excess $Si(vinyl)_4$ remaining in the reaction process may be removed under a vacuum condition.

In regard to Reaction Scheme 1, an organic solvent used may be benzene, toluene, or xylene, and the reaction may be performed, for example, for about 1 to about 48 hours at a temperature of about 10 to about 50° C.

Then, the base polymer of Formula 7 is further reacted with tetravinylsilane and the linear oligoferrocenylsilane of Formula 10 in the presence of a Pt-based catalyst, thereby preparing a base polymer of Formula 11 below, that is, a base polymer that is represented by Formula 5 and m3 is 1.

<Formula 11>

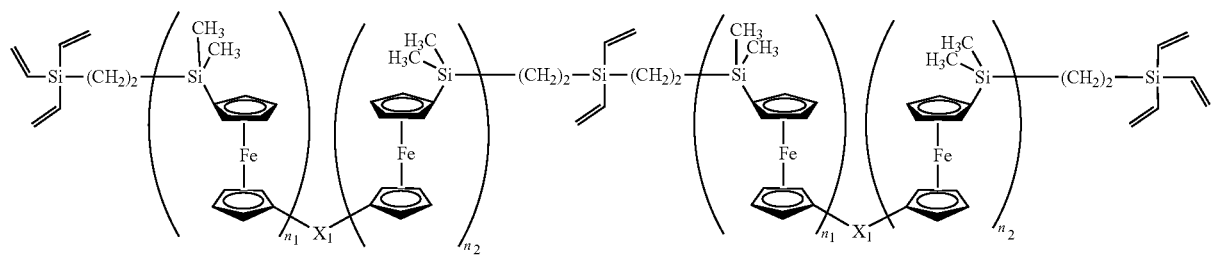

wherein
X₁ is

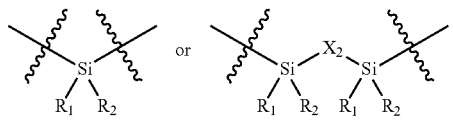

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group, and $n_1$ and $n_2$ are each independently a number of about 5 to about 95.

Preparation of Cross-Linker

The cross-linker of Formula 6 which is to react with the base polymer of Formula 5 may be prepared according to Reaction Scheme 2:

Reaction Scheme 2

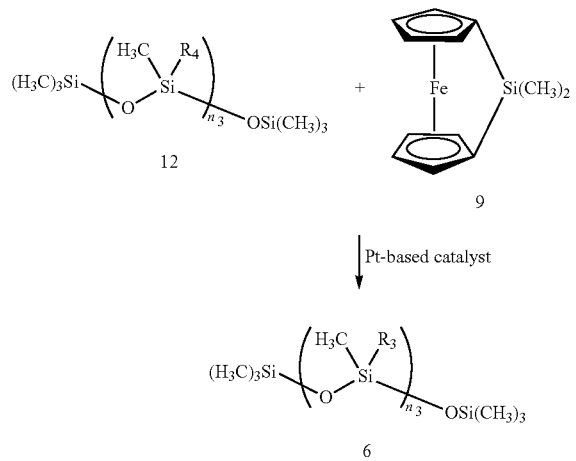

wherein as $R_4$, a methyl group and a hydrogen may coexist, as $R_3$, a methyl group and a ferrocenyl group of Formula 13 below may coexist, and $n_3$ is a number of about 10 to about 25:

<Formula 13>

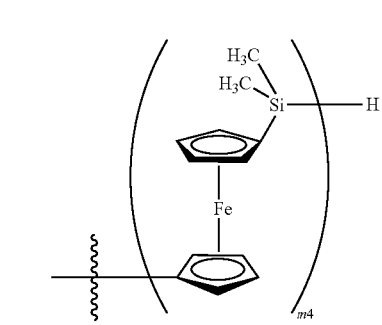

wherein m4 is a number of about 1 to about 10.

Reaction Scheme 2 is a process of preparing the cross-linker of Formula 6. In Reaction Scheme 2, the poly(dimethylsiloxan) of Formula 12 that is a linear oligomer is reacted with the dimethylsila[1]ferrocenophane of Formula 9 in the presence of a Pt-based catalyst, thereby producing the cross-linker of Formula 7.

In the poly(dimethylsiloxan) of Formula 12 used as a starting material, some methyl groups are substituted with hydrogen and a process for substituting the substituted hydrogen with the ferrocenyl group of Formula 13 is to be performed. That is, in the poly(dimethylsiloxan) of Formula 12, a methyl group and hydrogen may coexist as $R_4$ and a substitution ratio of hydrogen to the methyl group, that is, H/(H+methyl) may be in the range of about 0.1 to about 0.9, for example about 0.1 to 0.5. If the substitution ratio is about 0.5, hydrogen and the methyl group as $R_4$ may coexist in the ratio of about 1:1.

A hydrogen atom and a methyl group may coexist as $R_4$, and the hydrogen as $R_4$ is substituted with the ferrocenyl group of Formula 13 according to Reaction Scheme 2. That is, in the cross-linker of Formula 6, hydrogen and the ferrocenyl group of Formula 13 may coexist as $R_3$, and the ratio of the ferrocenyl group may be similar to the substitution ratio of the hydrogen as $R_4$. That is, when hydrogen and the methyl group as $R_4$ coexist in the ratio of about 1:1, the ratio of the methyl group to the ferrocenyl group as $R_3$ may be about 1:1.

Reaction Scheme 3 is an example of Reaction Scheme 2 when hydrogen and the methyl group coexist as $R_4$ in the ratio of about 1:1.

Reaction Scheme 3

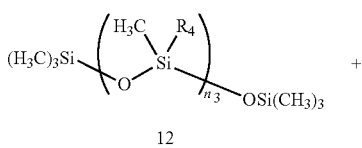

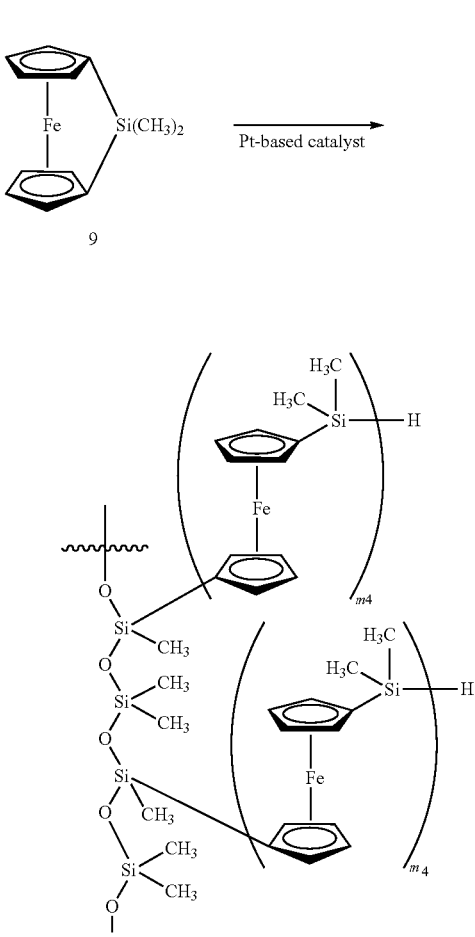

wherein $R_4$ includes a methyl group and hydrogen in the ratio of about 1:1, and $n_3$ is a number of about 10 to about 25, and each m4 is a number of about 1 to about 10.

In Reaction Scheme 3 above, $R_4$ includes a methyl group or hydrogen in the ratio of about 1:1, and the dimethylsila[1]ferrocenophane of Formula 9 is substituted with the hydrogen to produce the cross-linker of Formula 14 containing a methyl group and a ferrocenyl group in the ratio of about 1:1.

With regard to Reaction Scheme 2, an organic solvent may be utilized, for example, benzene, toluene, or xylene, for about 1 to about 48 hours at a temperature of about 10 to about 50°.

Reaction Scheme 2 may be performed in the presence of a Pt-based catalyst, and the Pt-based catalyst may be, for example, $Pt[(CH_2=CH-SiMe_2)_2O]_{1.5}$, which is a Carstedt's catalyst, or $Pt[(C_2H_4)Cl_2]_2$, which is a Zeise salt dimmer. The amount of the Pt-based catalyst may be in the range of about 0.01 mol % to about 1 mol % based on about 1 mol of a reactant.

Preparation of Poly(Ferrocenyl)Silane Based Network Polymer

After the base polymer and the cross-linker are prepared as described above, the base polymer and the cross-linker are reacted with each other according to Reaction Scheme 4 below in the presence of a Pt-based catalyst, thereby preparing a poly(ferrocenyl)silane based network polymer:

Reaction Scheme 4

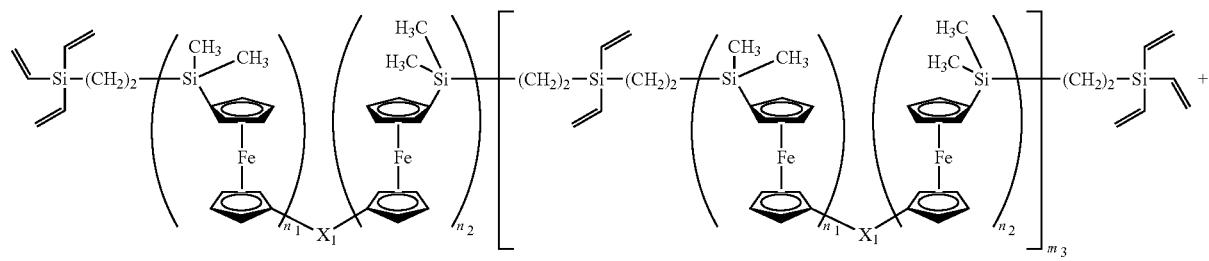

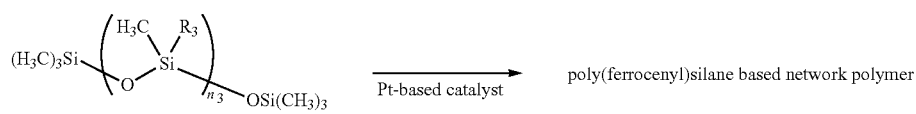

wherein
X$_1$ is

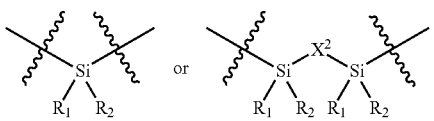

where R$_1$ and R$_2$ are each independently a substituted or unsubstituted C$_1$ to C$_{20}$ alkyl group or a substituted or unsubstituted C$_1$ to C$_{30}$ aryl group, and X$_2$ is —O—, —S—, a C$_1$ to C$_{20}$ substituted or unsubstituted alkylene group, or a C$_1$ to C$_{30}$ substituted or unsubstituted arylene group, n$_1$ and n$_2$ are each independently a number of about 5 to about 95, and m3 is a number of 0 or 1, In Reaction Scheme 4, a methyl group and the ferrocenyl group of Formula 13 below may coexist as R$_3$, and n$_3$ is a number of about 10 to about 25:

In Reaction Scheme 4, one of the vinyl groups at one end of the base polymer of Formula 5 is cross-linked to a hydrogen at an end of the ferrocenyl group of the cross-linker of Formula 6. That is, the base polymer of Formula 5 is not cross-linked to the R$_3$ linked to Si in the cross-linker of Formula 6 when R$_3$ is a methyl group, and only cross-linked to R$_3$ when R$_3$ is a ferrocenyl group.

The poly(ferrocenyl)silane based network polymer obtained as a result of the cross-linking reaction described above includes a repeating unit of Formula 1, a repeating unit of Formula 2, and a repeating unit of Formula 3:

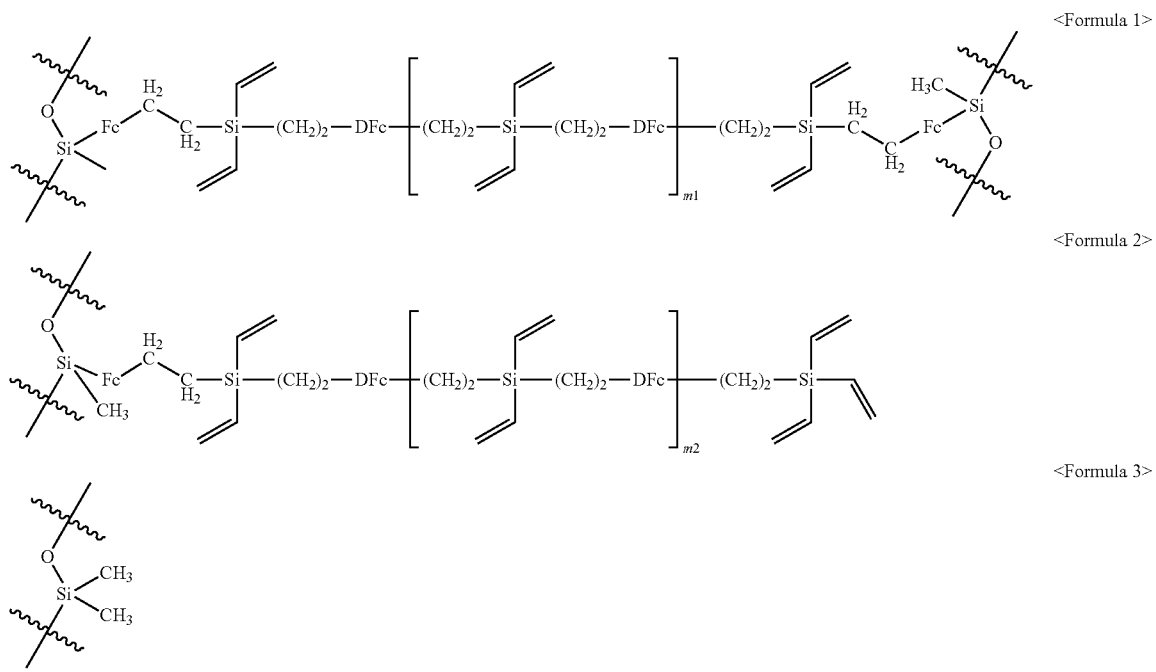

<Formula 1>

<Formula 2>

<Formula 3> wherein Fc is a ferrocenylene group of Formula 4a below, DFc is a diferrocenyl silane-based linking group of Formula 4b below, and m1 and m2 are each independently a number of 0 or 1;

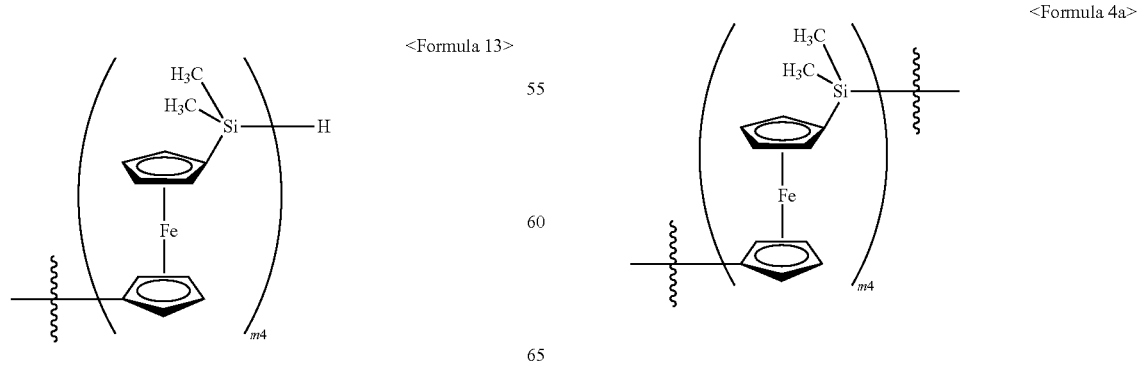

<Formula 13>

<Formula 4a> wherein m4 is a number of about 1 to about 10.

wherein m4 is a number of about 1 to about 10;

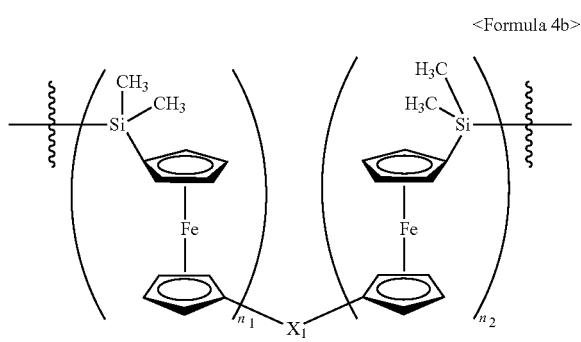

<Formula 4b> wherein $n_1$ and $n_2$ are each independently a number of about 5 to about 95, $X_1$ is

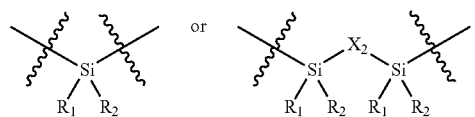

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

The repeating unit of Formula 1 refers to a case in which vinyl groups, which are all at ends of the base polymer of Formula 5) are cross-linked to the cross-linker of Formula 6, the repeating unit of Formula 2 refers to a case in which only a vinyl group at an end of the polymer of Formula 5 is cross-linked to the cross-linker of Formula 6, and the repeating unit of Formula 3 refers to a moiety of the cross-linker that is not cross-linked to the base polymer.

With regard to Reaction Scheme 4, an organic solvent may be utilized, for example, benzene, toluene, or xylene, for about 1 to about 48 hours at a temperature of about 30 to about 80°.

Reaction Scheme 4 may be performed in the presence of a Pt-based catalyst, and the Pt-based catalyst may be, for example, $Pt[(CH_2\!=\!CH\!-\!SiMe_2)_2O]_{1.5}$, which is a Carstedt's catalyst, or $Pt[(C_2H_4)Cl_2]_2$, which is a Zeise salt dimmer. The amount of the Pt-based catalyst may be in the range of about 0.01 mol % to about 1 mol % based on about 1 mol of a reactant material.

A poly(ferrocenyl)silane based network polymer according to example embodiments has a network structure including the repeating units of Formulae 1, 2, and 3, and the network structure is not a linear structure. Rather, the network has a steric structure in which the base polymer is linked to the cross-linker.

For example, the repeating unit of Formula 1 may be repeated in a form of a ladder to form a polymer, and the repeating units of Formulae 2 and 3 are interposed therebetween.

An example of the poly(ferrocenyl)silane based network polymer including the repeating units of Formulae 1, 2, and 3 is represented by Formula 15:

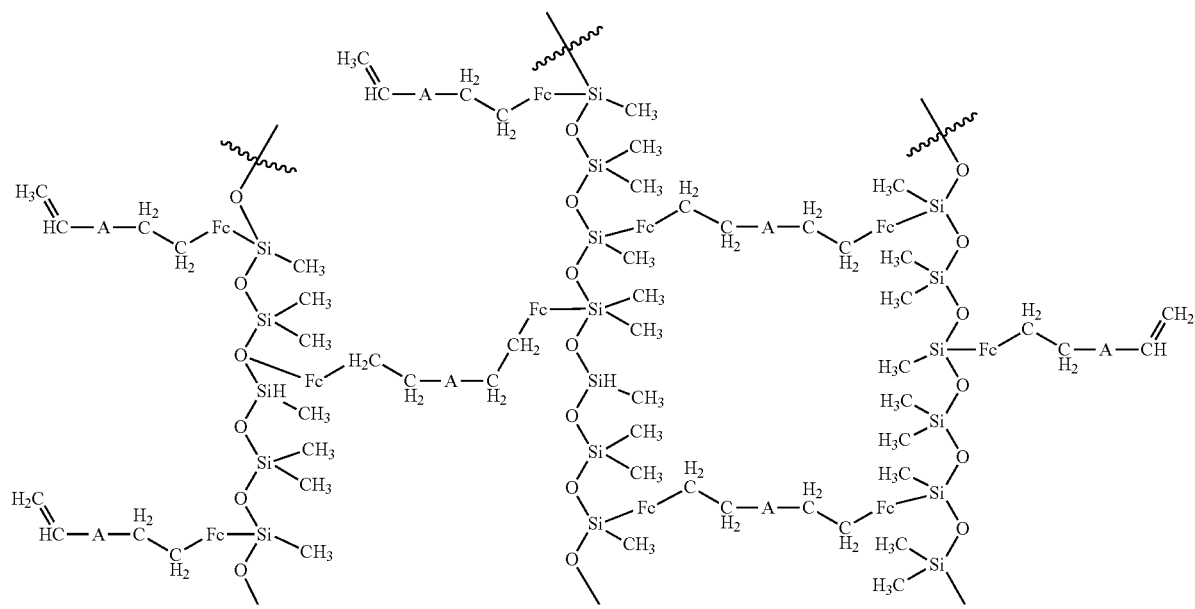

<Formula 15>

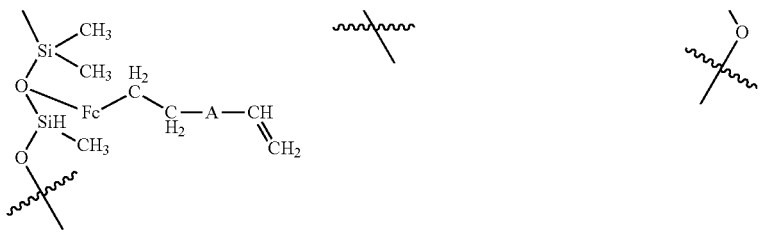
wherein A is
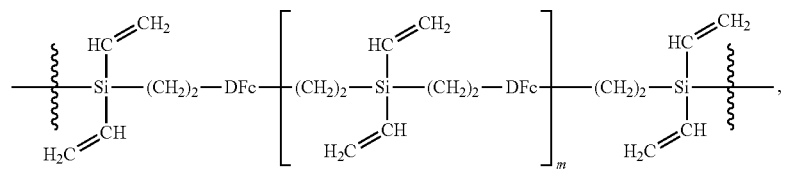
and Fc and DFc are as described above.
As shown in Formula 15, the network polymer does not have a simple linear structure, and the base polymer of Formula 5 is linked to the cross-linker of Formula 6 in a monodentate or bidentate type.
The repeating units of Formulae 1, 2 and 3 in Formula 15 are distinguishably marked in Formula 16 below:
<Formula 16>
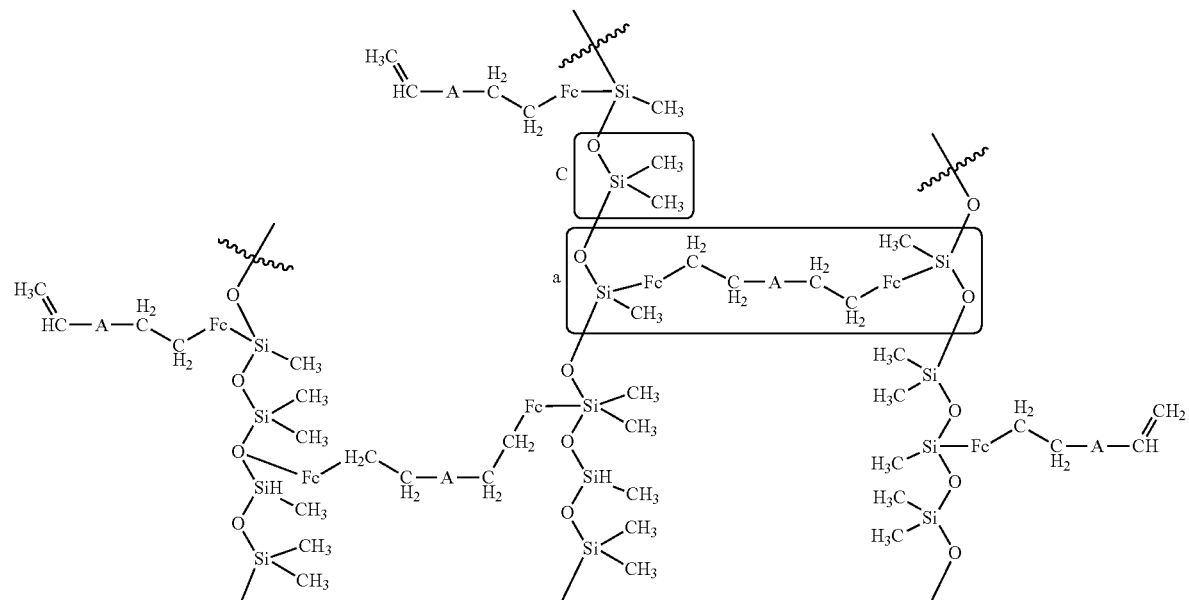

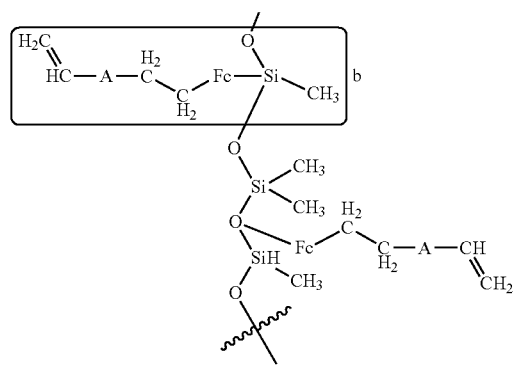
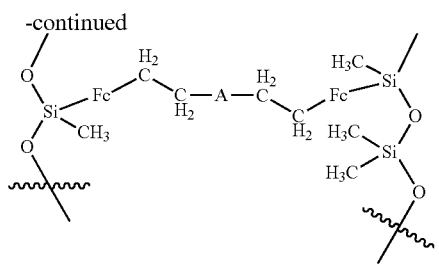

wherein A is

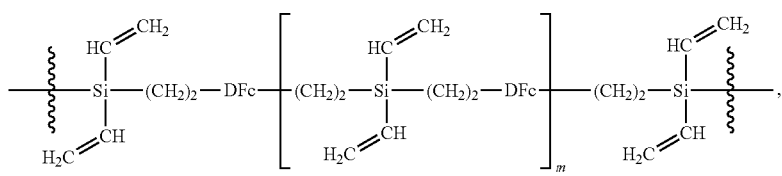

and Fc and DFc are as described above.

In regard to Formula 16, a is an example of the repeating unit of Formula 1, b is an example of the repeating unit of Formula 2, and c is an example of the repeating unit of Formula 3.

Formation of Poly(Ferrocenyl)Silane Based Polymer Film

The poly(ferrocenyl)silane based polymer having a network structure as described above may be used to form a film by, for example, spin-coating, dip-coating, or solvent-casting on various substrates, for example, a glass substrate, a indium tin oxide (ITO) substrate, or a plastic substrate.

The poly(ferrocenyl)silane based network polymer may be synthesized using as a starting material only one type of sila[1]ferrocenophane instead of a variety of sila[1]ferrocenophanes, and the manufacturing processes are not sensitive to purification. Thus, a desired level of purity may be easily obtained using only three to four recrystallization processes. In addition, in regard to the base polymer, a backbone length and the amount of a cross-linked vinylsilyic moiety may be easily controlled according to a ratio of sila[1]ferrocenophane, dihydrosilane, and tetravinylsilane which are used as a source. Furthermore, the cross-linker may be easily saturated with a ferrocene moiety, thereby enabling an increase of an electrochemically active species in the poly(ferrocenyl)silane based network polymer.

Moreover, the base polymer and the cross-linker may be prepared in situ while separation processes of respective components are not required. Because about 0.02 to about 0.5 mol % of Pt-based catalyst based on a Si—H unit are equally used in all of the processes and retain their reactivity, the Pt-based catalyst may not need to be repeatedly added thereafter once added at the starting point. In addition, a hardening process for obtaining a final product does not require ultraviolet rays irradiation and inert atmosphere, and may be completely performed at a temperature of about 50 to about 70° for just a few hours.

Because the base polymer and the cross-linker for forming the network polymer are immediately used when needed, even when the base polymer and the cross-linker are prepared in advance and preserved, the base polymer and the cross-linker are capable of being preserved without a decrease in quality.

As described above, the poly(ferrocenyl)silane based network polymer may be easily prepared having an increased yield, and may be used as an active component of a controllable photonic crystal. In addition, the poly(ferrocenyl)silane based network polymer may be used in a transparent actuator or a biosensor, or as an counter redox material of a transparent electrode.

With regard to use of the poly(ferrocenyl)silane based network polymer in a photonic crystal display device, because the amount of a ferrocene moiety as an electroactive redox component is higher, the concentration thereof is adjustable, and cross-linkage density is higher. Therefore, display devices with increased switching speed, a wider color range, and higher durability may be produced while satisfying demands of consumers.

An example of the display device may be a reflection type color display device. As shown in FIG. 1, the reflection type color display device may include a cathode 1, an anode 2, and an electrolyte 3 disposed between the cathode 1 and the anode 2, wherein the electrolyte 3 includes the poly(ferrocenyl)silane based network polymer and a photonic crystal.

Figure 2:
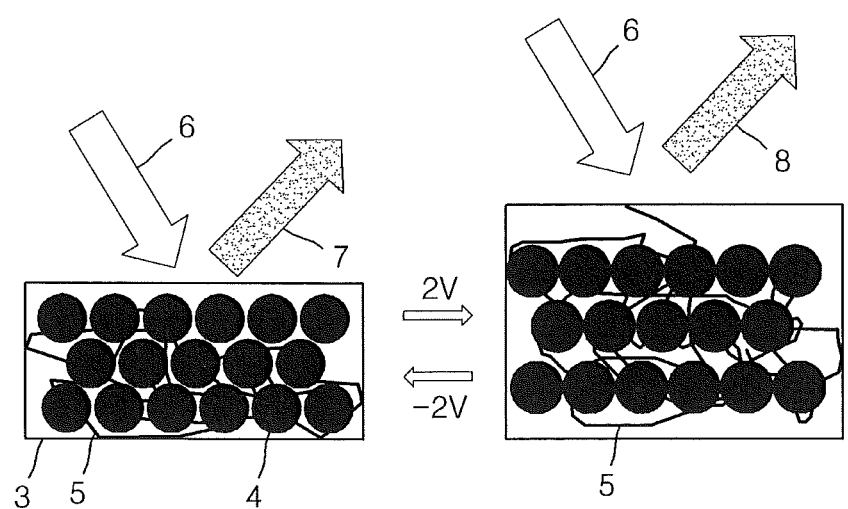
FIG. 2 shows a photonic crystal layer comprising poly(ferrocenyl)silane based network polymers according to example embodiments.

For example, the electrolyte 3 may include a photonic crystal layer formed by self-assembling mono-dispersed silica 4 as shown in FIG. 2. An empty interval between the silica particles may be infiltrated with the poly(ferrocenyl)silane based network polymer 5, and the electrolyte 3 may be filled between electrodes formed of ITO. When a voltage is applied to the electrodes 1 and 2, expansion/shrinkage occurs due to a redox reaction of the poly(ferrocenyl)silane based network polymer 5. Thus, a lattice distance of the photonic crystal and color of the photonic crystal may be changed. In FIG. 2, when a device having a structure as described above is used, white light 6 enters and a selected color, for example, blue light 7, is reflected. The residual light transmits the device, and thus, only blue light 7 is viewed. When a voltage is applied thereto, expansion occurs due to a redox reaction of poly(ferrocenyl)silane based network polymer 5, and thus, reflection of a selected color, for example, red light 8, may be induced. Accordingly, color of the full visible region is embodied in one pixel, thereby enabling use of the device as a reflection type color display device.

Figure 3A:
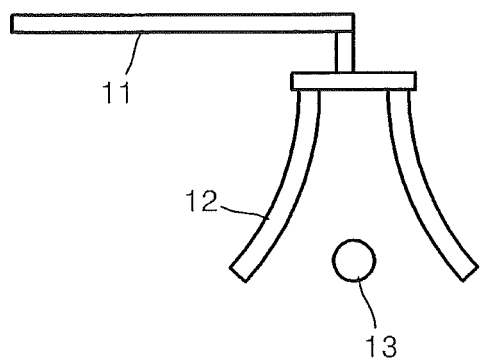
FIGS. 3A and 3B show an artificial finger using poly(ferrocenyl)silane based network polymers according to example embodiments.
Figure 3B:
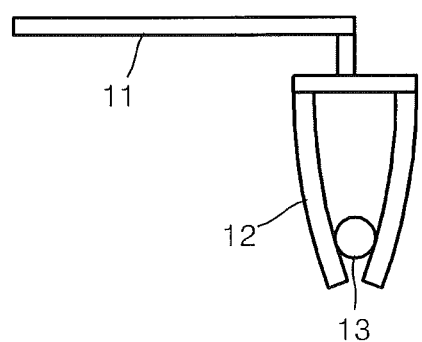

The poly(ferrocenyl)silane based network polymer may be used in an artificial muscle, drug delivery, a microfluidic device, a smart actuator, or a sensor. For example, as illustrated in FIGS. 3A and 3B, the poly(ferrocenyl)silane based network polymer 12 may be used in an artificial finger or artificial muscle 11 which is used to hold an article 13. The artificial finger or artificial muscle 11 may hold the article 13 by using the deformation of the poly(ferrocenyl)silane based network polymer 12 that occurs when a voltage is applied thereto.

Hereinafter, example embodiments will be described in detail; however, example embodiments are not limited thereto.

Example 1 a) Preparation of Cross-Linker

Hydrogenated polydimethylsiloxane Me[(HSiMeO) (SiMe$_2$O)]$_6$SiMe$_3$ (65 mg, 0.4 mmol, Si—H) and zeise salt dimer [Pt(C$_2$H$_4$)Cl$_2$]$_2$ (10 mM, 0.8 mL, 1 mol %) were added to a solution in which 1.2 mL of benzene was dissolved in FcSiMe$_2$ (200 mg, 0.8 mmol) at a temperature of about 25° C., and then mixed for about 3 to about 5 hours. The molecular weight of Me[(RSiMeO)(SiMe$_2$O)]$_6$SiMe$_3$ (R=—(Fc-SiMe$_2$)$_2$H) as a cross-linker was about 3,800, and the amount of ferrocene moiety was about 75% (percentate=ferrocenyl group/(methyl group+ferrocenyl group)×100).

b) Preparation of Base Polymer: Trivinylsilyl Capped Polyferrocenylsilane

Carstedt's catalyst (Aldrich, 2% Pt in xylene, 5 μl, 0.43 mol % to Ph$_2$SiH$_2$) was added to 0.24 g (1.00 mmol) of dimethylsila[1]ferrocenophane(dimethylsila[1]ferrocenophane) and 19 μl (0.10 mmol) of diphenylsilane Ph$_2$SiH$_2$ which had been dissolved in 3 ml of benzene, at a temperature of 25° C. while stirring, and the reaction was performed for 1 to 3 hours. The reaction product was identified by nuclear magnetic resonance (NMR).

1H NMR (δ, CDCl$_3$): 7.57-7.64 (o-H, Ph, 4H); 7.35-7.41 (m-H and p-H, Ph, 6H); 3.9-4.3 (C5H4, Fc, 77H), 0.25-0.55 (SiMe2, 58H); 5.44 (Ph2Si—H, 0.2-0.7H); 4.42 (Me2Si—H, 1.3-1.8H).

Tetravinylsilane (340 ul, 2 mmol, 10 times excess) was added to the prepared solution and the reaction was performed for 3 days. A solvent was removed and the residual was dried.

1H NMR (δ, CDCl$_3$): 7.50-7.62 (o-H, Ph, 4H); 7.32-7.40 (m-H and p-H, Ph, 6H); 3.8-4.3 (C$_5$H$_4$, Fc, 77H), 0.25-0.55 (SiMe$_2$+CH$_2$, 64H); 5.7-5.8 (Vinyl, 5H); 6.0-6.2 (Vinyl, 10H).

c) Preparation of Crosslinked Poly Hydroferrocenylsilane

Carstedt's catalyst (Aldrich, 2% Pt in xylene, 3 ul, 0.26 umol Pt, 0.25 mol % to Si—H) were added to 0.26 g (1.1 mmol) of dimethylsilaferrocenophane(dimethylsilaferrocenophane) and 0.087 g (0.09 mmol) of polyhydrosiloxane (Me$_3$Si—[(OSiMeH)(OSiMe$_2$)$_6$]$_3$—H) which had been dissolved in 3 ml of benzene while stirring. The reaction was performed for 3 hours. A solvent was removed and the residue was dried.

$^1$H NMR (δ, CDCl$_3$): 4.7 (singlet, FcSiMe$_2$H, 5H), 4.0-4.2 (C$_5$H$_4$, Fc, 8H), 0.3-0.7 (Me, OSiMe$_2$+OSiMeFc+SiMe$_2$Fc+SiMe$_3$, 11H).

d) Preparation of PFS Film

The reaction products prepared according to b) and c) were mixed and then left to sit at room temperature for one day. The mixture was spin-coated on a glass substrate and treated for 3-12 hours at a temperature of 70° C., thereby producing a transparent yellow-orange glassy coating.

Experimental Example

Figure 4:
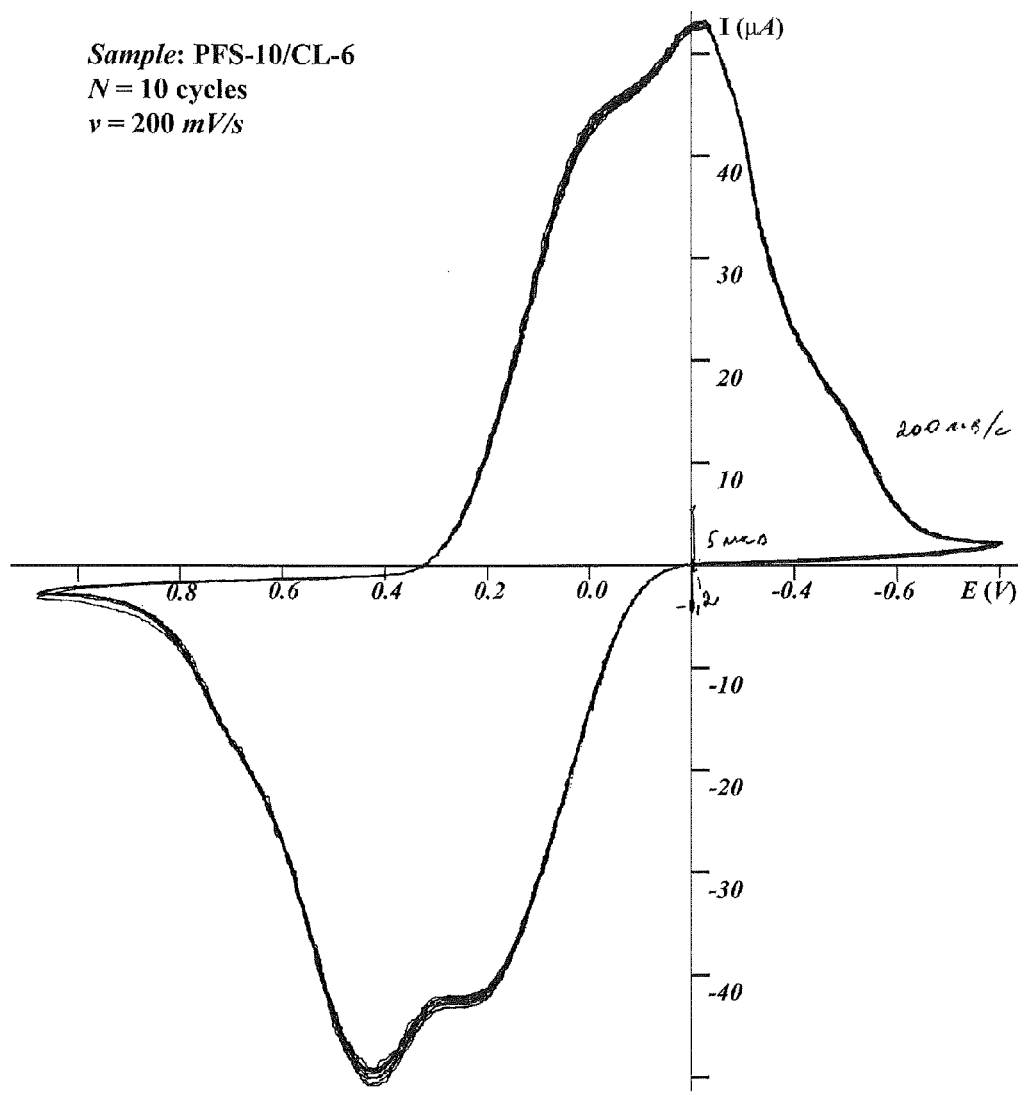
FIG. 4 shows electrochemical characteristics of a polymer film prepared according to Example 1.

Electric properties of the film prepared according to Example 1 were evaluated by cyclic voltametry and the results are shown in FIG. 1. Referring to FIG. 4, oxidation and reduction occur reversibly.

As described above, according to example embodiments, a poly(ferrocenyl)silane based network polymer may be prepared using a simplified process. Use of a Pt-based catalyst in the preparation of a base polymer, a cross-linker and a network polymer by cross-linking the base polymer and the cross-linker enables an in situ reaction, intermediate products do not need to be purified, and a cross-linking process, that is a final process, is performed under a mild condition, e.g., by heating.

In addition, in the case in which the network polymer is used to form a cross-linked polymer film, a substrate to be coated on the film may be functionalized by treating with a vinyl group and a cross-linker is grafted thereto. By doing so, use of excess poly(ferrocenyl)silane is prevented or reduced, and a decrease in optical characteristics is minimized or reduced while properties of a device are improved.

It should be understood that example embodiments described therein should be considered in a descriptive sense only and not for purposes of limitation. Descriptions of features or aspects within each embodiment should typically be considered as available for other similar features or aspects in other example embodiments.

What is claimed is:

1. A poly(ferrocenyl)silane based network polymer comprising:
a repeating unit represented by Formula 1, a repeating unit represented by Formula 2, and a repeating unit represented by Formula 3:

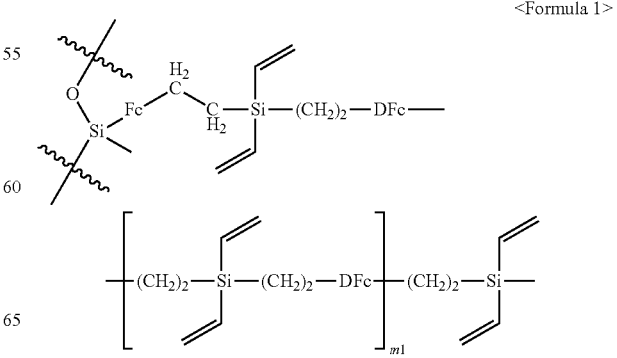

<Formula 1>

-continued

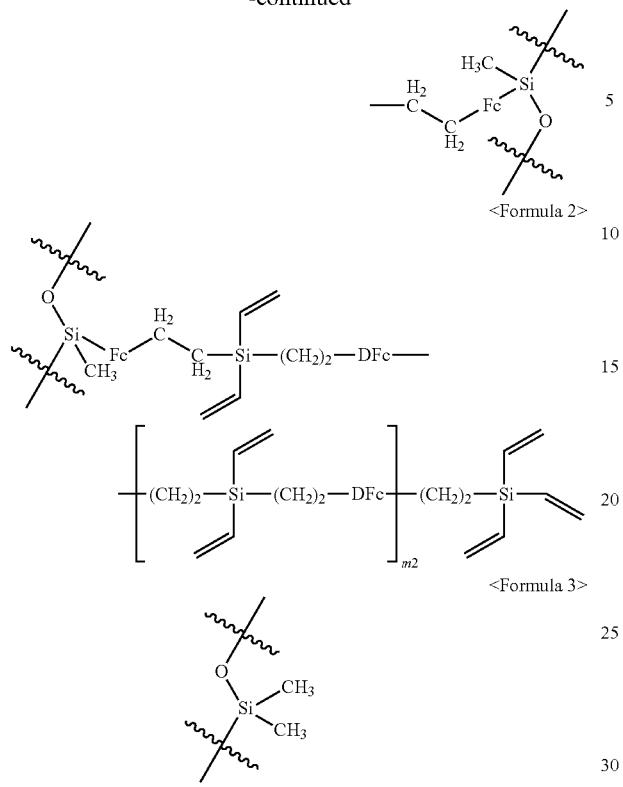

<Formula 2>

<Formula 3>

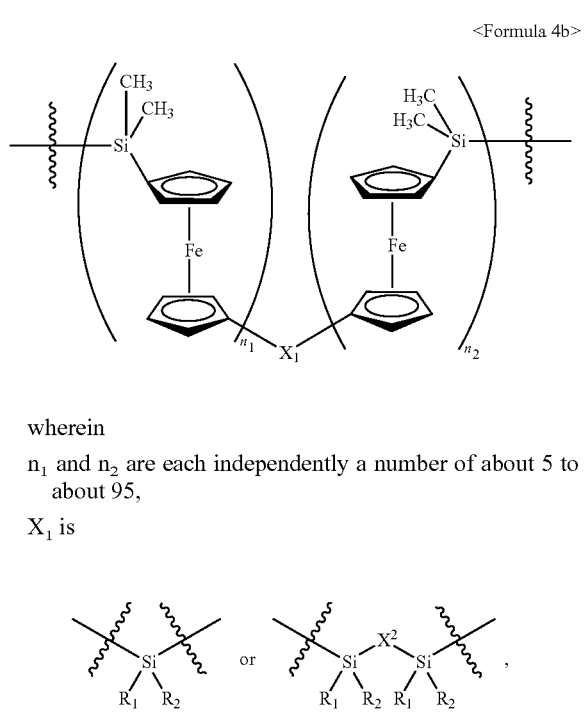

<Formula 4b> wherein n₁ and n₂ are each independently a number of about 5 to about 95,

X₁ is

[structure shown]

wherein $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

2. The poly(ferrocenyl)silane based network polymer of claim 1, wherein the repeating unit of Formula 1 has a polymerization degree of about 5 to about 100, the repeating unit of Formula 2 has a polymerization degree of about 5 to about 100, and the repeating unit of Formula 3 has a polymerization degree of about 10 to about 25.

3. The poly(ferrocenyl)silane based network polymer of claim 1, wherein at least one of the repeating unit of Formula 2 and the repeating unit of Formula 3 is interposed between repeating units of Formula 1.

4. A method of preparing poly(ferrocenyl)silane based network polymer, the method comprising:
cross-linking a base polymer represented by Formula 5 with a cross-linker represented by Formula 6:

wherein Fc is a ferrocenylene group represented by Formula 4a, DFc is a diferrocenyl silane-based linking group represented by Formula 4b, and m1 and m2 are each independently 0 or 1:

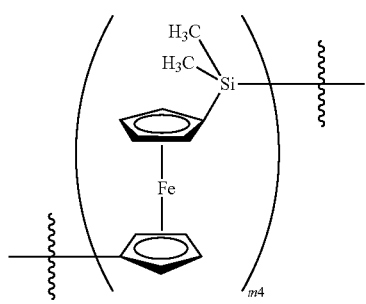

<Formula 4a> wherein m4 is a number of about 1 to about 10;

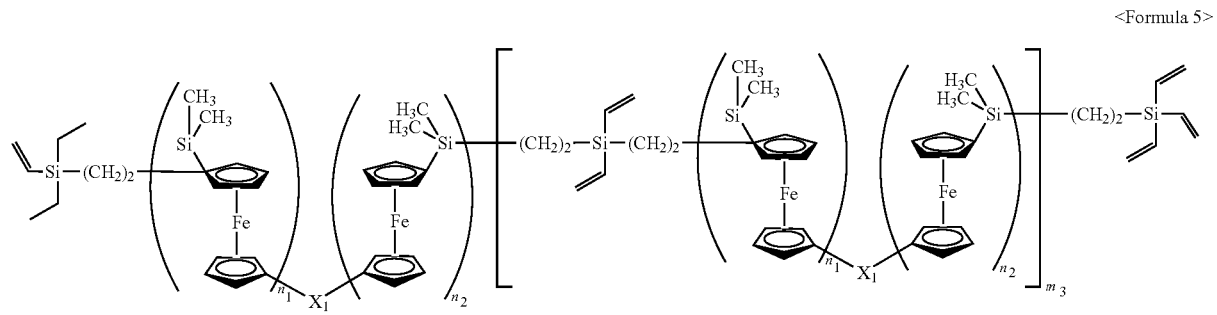

<Formula 5> wherein $n_1$ and $n_2$ are each independently a number of about 5 to about 95, m3 is 0 or 1, $X_1$ is

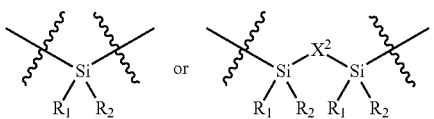

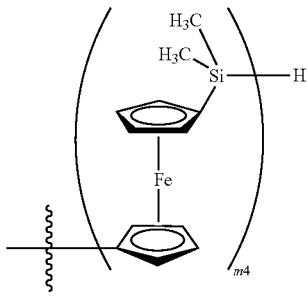

<Formula 13> wherein m4 is a number of about 1 to about 10.

5. The method of claim 4, wherein the base polymer represented by Formula 5 is a base polymer represented by Formula 7:

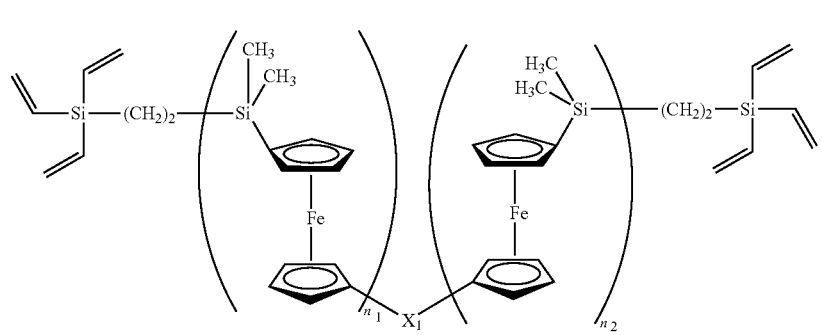

<Formula 7> where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group;

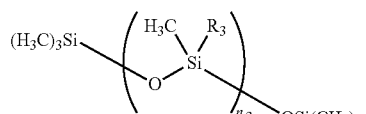

<Formula 6> wherein $n_3$ is a number of about 1 to about 10, and each $R_3$ may be hydrogen or a ferrocenyl group represented by Formula 13, and when hydrogen and a ferrocenyl group are both present as $R_3$ in different monomeric units, a ratio of hydrogen to the sum of hydrogen and the ferrocenyl group is in the range of about 0.1 to about 0.9:

$n_1$ and $n_2$ are each independently a number of about 5 to about 95, $X_1$ is

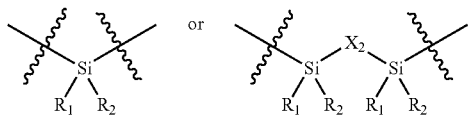

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

6. The method of claim 5, wherein the method further comprises:

reacting dihydrosilane represented by Formula 8 with dimethylsila[1]ferrocenophane represented by Formula 9 in the presence of a Pt-based catalyst, thereby obtaining a linear oligoferrocenylsilane represented by Formula 10 having Si—H at both ends, and reacting the linear oligoferrocenylsilane in the presence of tetravinylsilane, thereby obtaining the base polymer of Formula 7:

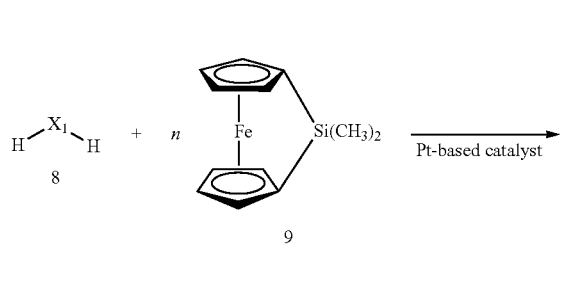
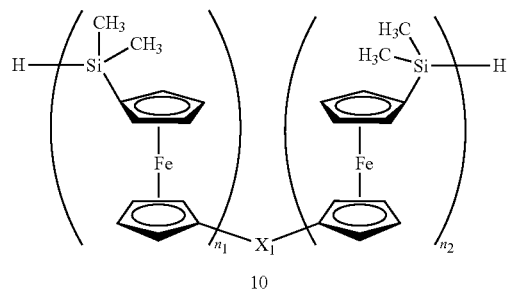

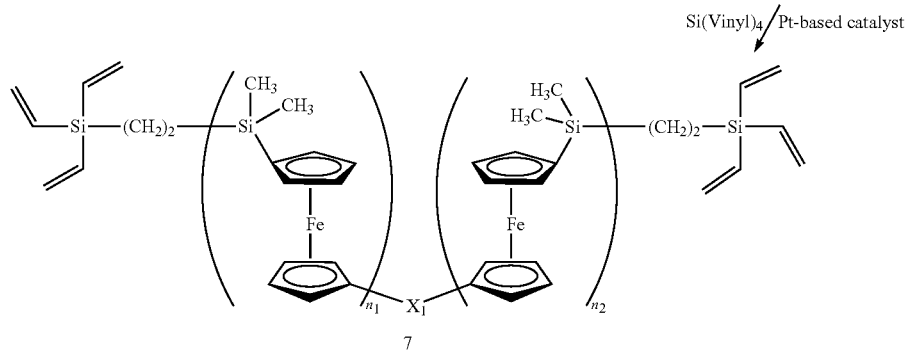

wherein
$X_1$ is

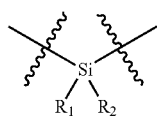 or 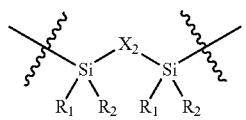

where $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group, $n_1$ and $n_2$ are each independently a number of about 5 to about 95, and n represents $n_1 + n_2$.

7. The method of claim 6, wherein the method further comprises:
reacting the base polymer of Formula 7 with tetravinylsilane and the linear oligoferrocenylsilane of Formula 10 in the presence of a Pt-based catalyst, thereby preparing a base polymer represented by Formula 11 below:

wherein
$X_1$ is

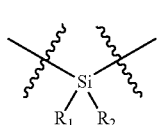 or 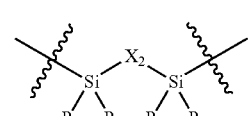

where $R_1$ and $R_2$ are each independently a substituted or unsubstituted $C_1$ to $C_{20}$ alkyl group or a substituted or unsubstituted $C_1$ to $C_{30}$ aryl group, $X_2$ is —O—, —S—, a $C_1$ to $C_{20}$ substituted or unsubstituted alkylene group, or a $C_1$ to $C_{30}$ substituted or unsubstituted arylene group, and $n_1$ and $n_2$ are each independently a number of about 5 to about 95.

8. The method of claim 4, where the cross-linker of Formula 6 is obtained by reacting poly(dimethylsiloxan) represented by Formula 12 below as a linear oligomer with dimethylsila[1]ferrocenophane represented by Formula 9 in the presence of a Pt-based catalyst:

<Formula 11>

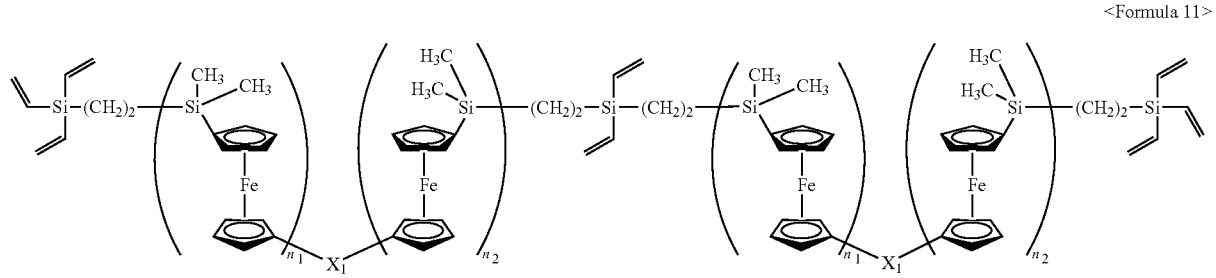

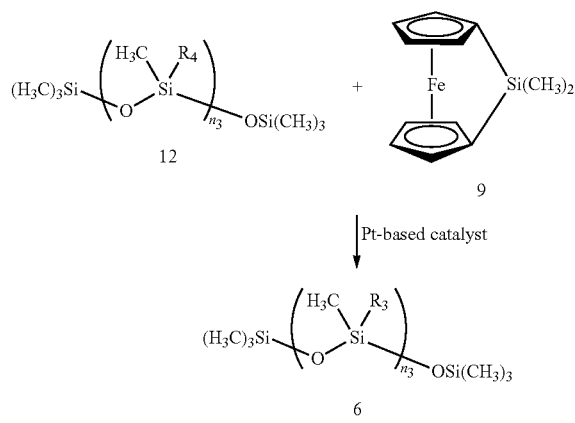

9. The method of claim 8, wherein $R_4$ of the poly(dimethylsiloxan) of Formula 12 is at least one of a methyl group and a hydrogen atom, and a substitution ratio of the hydrogen atom to the methyl group represented by H/(H+methyl) is in the range of about 0.1 to about 0.9.

10. The method of claim 8, wherein $R_3$ of the cross-linker of Formula 6 is a methyl group and the ferrocenyl group of Formula 13, and a ratio represented by ferrocenyl group/(methyl group+ferrocenyl group) is in the range of about 0.1 to about 0.9.

11. The method of claim 4, wherein the poly(ferrocenyl) silane based network polymer includes a repeating unit represented by Formula 1, a repeating unit represented by Formula 2, and a repeating unit represented by Formula 3:

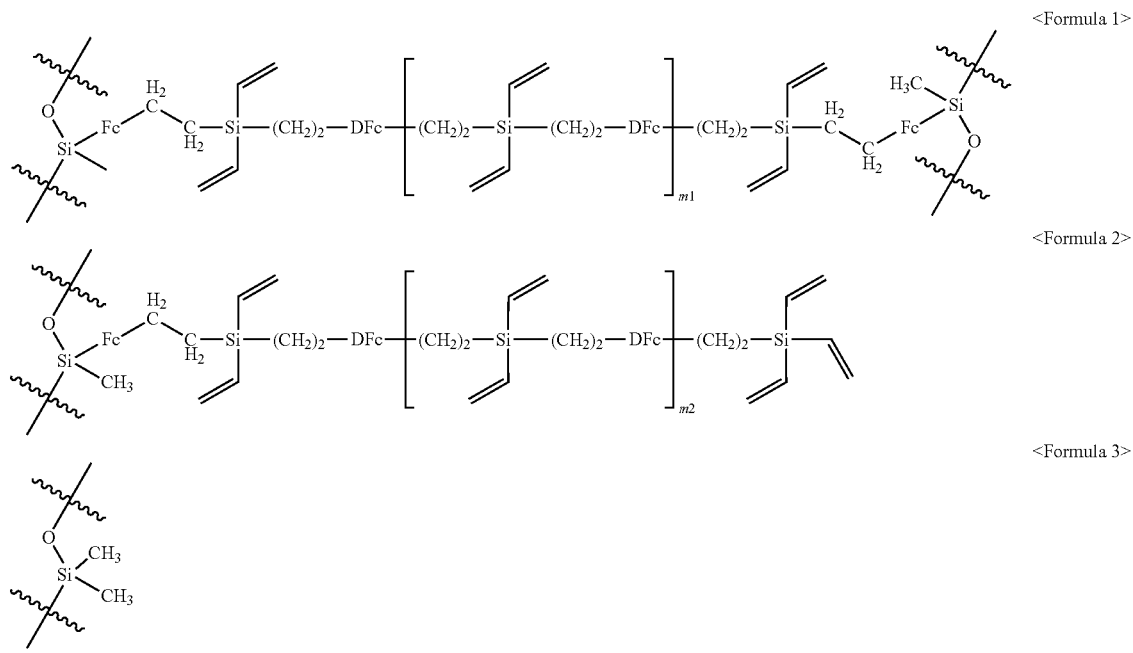

wherein a methyl group and a hydrogen coexist as $R_4$, a methyl group and a ferrocenyl group of Formula 13 below coexist as $R_3$, and $n_3$ is a number of about 10 to about 25:

wherein Fc is a ferrocenylene group represented by Formula 4a, DFc is a diferrocenyl silane-based linking group represented by Formula 4b, and m1 and m2 are each independently 0 or 1:

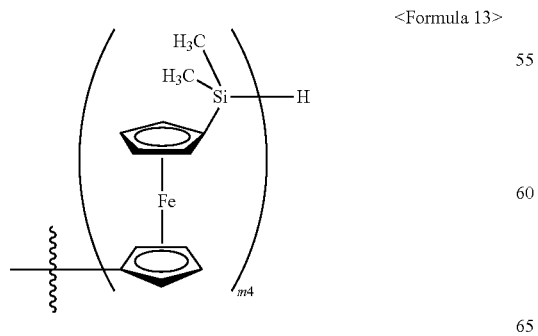

wherein m4 is a number of 1 to 10.

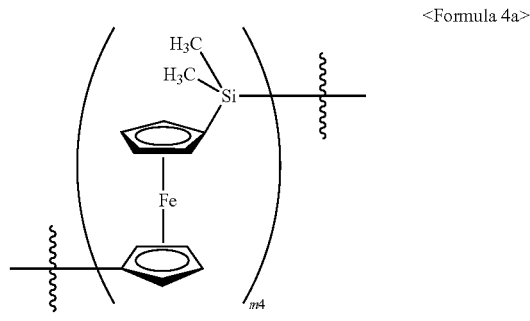

wherein m4 is a number of about 1 to about 10;

<Formula 4b>

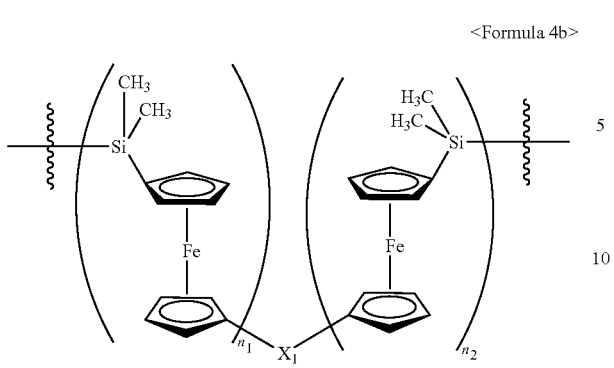

wherein
$n_1$ and $n_2$ are each independently a number of about 5 to about 95,
$X_1$ is

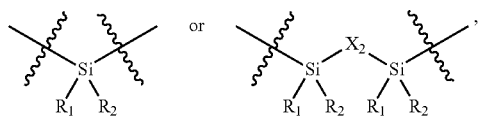

wherein $R_1$ and $R_2$ are each independently a substituted or unsubstituted $C_1$ to $C_{20}$ alkyl group or a substituted or unsubstituted $C_1$ to $C_{30}$ aryl group, and $X_2$ is —O—, —S—, a $C_1$ to $C_{20}$ substituted or unsubstituted alkylene group, or a $C_1$ to $C_{30}$ substituted or unsubstituted arylene group.

12. A polymer film comprising the poly(ferrocenyl)silane based network polymer of claim 1 bonded to a substrate.

13. A reflection type color display device comprising a cathode, an anode, and an electrolyte between the cathode and the anode, wherein the electrolyte comprises the poly(ferrocenyl)silane based network polymer of claim 1 and a photonic crystal.

14. A device comprising the poly(ferrocenyl)silane based network polymer of claim 1.

\* \* \* \* \*